United States Patent [19]

Camp

[11] Patent Number: 5,599,376
[45] Date of Patent: Feb. 4, 1997

[54] PROCESS AND EQUIPMENT TO RECLAIM REUSABLE PRODUCTS FROM EDIBLE OIL PROCESS WASTE STREAMS

[76] Inventor: John D. Camp, 168 Weston Rd., Arden, N.C. 28704

[21] Appl. No.: 563,042

[22] Filed: Nov. 27, 1995

[51] Int. Cl.[6] .................................................. C22B 4/02
[52] U.S. Cl. .................. 75/10.65; 554/12; 554/13; 554/176; 554/177; 554/193; 502/80; 210/634
[58] Field of Search ........................... 554/12, 13, 20, 554/21, 176, 206, 210, 191, 193, 170, 177; 502/80; 75/10.65; 210/634

[56] References Cited

U.S. PATENT DOCUMENTS

| | | |
|---|---|---|
| 852,441 | 5/1907 | Lockwood . |
| 2,152,667 | 4/1939 | Rosenthal . |
| 2,415,313 | 2/1947 | Thurman . |
| 2,416,196 | 2/1947 | Mortenson . |
| 2,509,509 | 5/1950 | Leaders et al. . |
| 2,548,434 | 4/1951 | Leaders . |
| 2,577,079 | 12/1951 | Gee . |
| 4,285,832 | 8/1981 | Orth, Jr. . |
| 4,584,140 | 4/1986 | Blewett et al. . |
| 4,956,125 | 9/1990 | Kawamata et al. . |

*Primary Examiner*—Robert J. Popovics

[57] ABSTRACT

A process for recovering edible oil and bleaching clay from an edible oil-bleaching clay waste stream and for recovering edible oil and nickel catalyst from a hydrogenated edible oil-nickel catalyst-filter aid waste stream; the recovered bleaching clay may be reused directly and the recovered nickel catalyst and filter aid mixture is pelletized for metallurgical nickel recovery.

6 Claims, 2 Drawing Sheets

PROCESS AND EQUIPMENT TO RECLAIM REUSABLE PRODUCTS FROM EDIBLE OIL PROCESS WASTE STREAMS

BACKGROUND

The process as disclosed is particularly applicable to recovery of usable products from waste streams from soybean oil refining and soybean oil hydrogenation but with minor changes should be applicable to other types of waste streams from edible oil refining.

Crude soybean oil is refined to remove free fatty acids, phosphatides, gum, settlings, coloring matters such as chlorophyll, xanthophyll, and miscellaneous unsaponifiable materials.

The first step in the crude oil refining is the degumming process, wherein phospholipids are removed. in the following steps the degummed oil is treated with sodium hydroxide to remove free fatty acids and residual or remaining trace amounts of phospholipids. Neutral oils are then recovered by centrifugation. The next step in the process is a bleaching process which uses acid activated clay and/or carbon to absorb and remove products such as chlorophyll, xanthophyll, peroxides and their breakdown products to improve flavor and produce oil with acceptable flavor and stability. During the bleaching process about 0.3 to 1.5 percent by weight of the bleaching clay is heated to 212 to 248 degrees Fahrenheit for about fifteen minutes. The bleaching clay is separated from the oil by filtration and each pound of the clay absorbs about 0.4 pounds of the oil. The used clay containing the absorbed oil is usually discarded as waste material. The oil lost in this fashion is estimated to be about 110,687 tons per year. One of the objectives of the invention is recovery of the edible oil from this waste stream when either carbon or bleaching clay is used. Note that the final step in the purification is deodorization.

The hydrogenation process is quite generally a batch process using a nickel catalyst. Depending upon the time of hydrogenation, temperature, catalyst concentration pressure etc.. the hydrogenated product may be very fluid, semi-sold, or quite firm.

When the hydrogenation batch is complete the hydrogenated product is circulated through a filter coated with filter aid until the oil is free of nickel. The filter aid and nickel catalyst may be reused several times. When the catalyst is exhausted the exhausted mixture can be processed to recover the nickel.

The invention provides for a novel versatile process to recover edible oil from both process waste streams. An extractor and a desolventizer pair is used for each process waste stream and since the same solvent may be used to dissolve either the unhydrogenated or hydrogenated oil a common solvent recovery system is used. In a first operating mode the waste stream containing filter aid and nickel catalyst is fed through an extractor wherein the hydrogenated oil is dissolved out of the filter aid-nickel catalyst mixture and the oil rich solvent stream is sent to the solvent recovery system. The filter aid-nickel catalyst mixture that may contain as much as 70 percent by weight of the oil is fed to a desolventizer unit that vaporizes the solvent which then feeds to the solvent recovery unit. The solvent free filter aid-nickel catalyst flows to a pelletizer in order that the otherwise free flowing light powder may be fed directly into an electromelt furnace for nickel recovery in the normal manner. The hydrogenated oil from the solvent recovery unit drains completely from the oil stripper in the last stage of the solvent recovery system.

With cessation of feed of the filter aid- catalyst waste stream the feed of the oil-bleaching clay mixture may be started through it's dedicated extractor and desolventizer with the common solvent recovery system continuing to operate. The unhydrogenated oil will then be recovered from the oil stripper in the solvent recovery system and reusable bleaching clay will be recovered from the desolventizer.

In pilot plant use we found that hexane was particularly suited for use as a solvent. The filter aid and catalyst are quite fine and settle very slowly so that a low viscosity solvent is desirable. A low boiling solvent is desirable to facilitate total removal of the solvent from the recovered edible oil in the solvent recovery system. However other inert hydrocarbons, alcohols, halogenated inert hydrocarbons, and mixtures thereof should be usable.

SUMMARY OF THE INVENTION

The invention provides for a novel versatile process to recover edible oil from waste streams such as streams from soybean oil purification and from soybean oil hydrogenation. Both the soybean oil and hydrogenated soybean oil are edible oils and both are soluble in the same solvent. An extractor and a desolventizer pair is used for each process waste stream and since the same solvent may be used to dissolve either the unhydrogenated or hydrogenated oil a common solvent recovery system is used. In a first operating mode the waste stream containing filter aid and nickel catalyst is fed through a counter-current extractor wherein the hydrogenated oil is dissolved out of the filter aid-nickel catalyst mixture and the oil rich solvent stream is sent to the solvent recovery system. The filter aid-nickel catalyst mixture that may contain as much as 70 percent by weight of the oil is fed to a desolventizer unit that vaporizes the solvent which then feeds to the solvent recovery unit. The solvent free filter aid-nickel catalyst flows to a pelletizer in order that the otherwise free flowing light powder may be fed directly into an electromelt furnace for nickel recovery in the normal manner. The hydrogenated oil from the solvent recovery unit drains completely from the oil stripper in the last stage of the solvent recovery system.

With cessation of the filter aid- catalyst waste stream feed the feed of the oil-bleaching clay waste stream may be started through it's dedicated extractor and desolventizer with the common solvent recovery system continuing to operate. The unhydrogenated oil will then be recovered from the oil stripper in the solvent recovery system and reusable bleaching clay will be recovered from the desolventizer. The recovered bleaching clay retains between 70 and 100 percent of it's initial activity and may be directly recycled.

In the solvent recovery system the oil rich solvent from the extractor unit is fed to a three stage evaporator and stripping unit that strips the solvent overhead and allows the stripped edible oil to drain from the base of the last stage which is the oil stripping unit. The solvent with any associated water is stripped overhead, condensed, and sent to a decanter. The solvent stream from the decanter may be recycled to the extractor unit which is preferably a counter current extractor and the water stream may be sent to a waste water reboiler to boil off any solvent before sending the water to the sewer.

Solvent vapors from both the counter current extractors and the desolventizers are sent to a condenser and the liquid solvent from the condenser is also sent to the decanter.

DETAILED DESCRIPTION OF THE INVENTION

Figure 1:
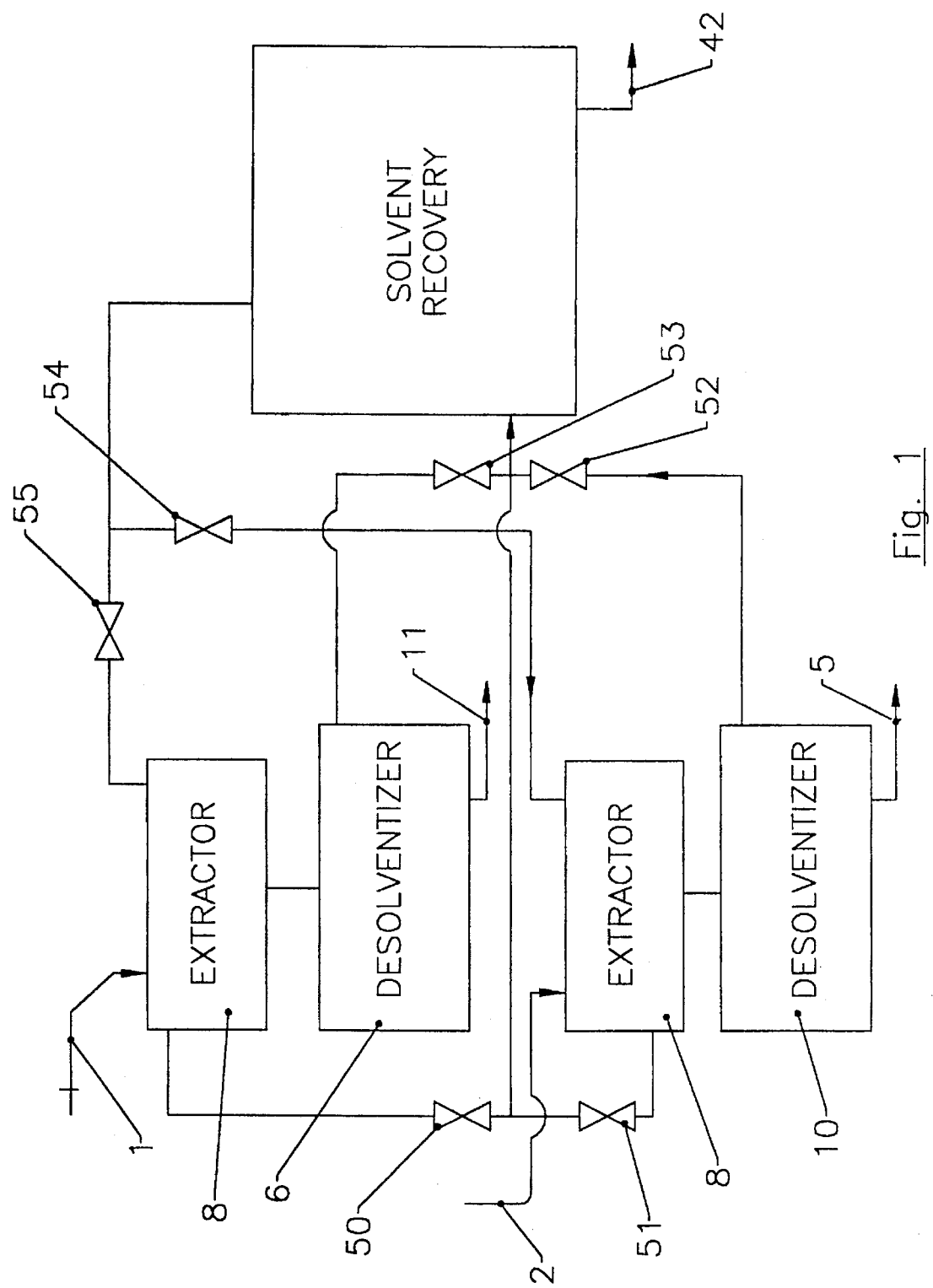
FIG. 1 shows the process flow in block flowsheet form indicating major equipment and process flow streams.

The invention may best be described from the drawings. In FIG. 1 we show the major equipment in block flowsheet form. Waste stream feed 1 goes to an extractor 4 that feeds to a desolventizer 6 with solids 11 being discharged from the desolventizer for recycle or recovery. In the same way waste stream 2 feeds to an extractor 8 and desolventizer 10 and solids 5 are discharged from the desolventizer for reuse. Each extractor and desolventizer pair feed solvent to a common solvent recovery system 36. Recovered solvent is recycled and the recovered oil is discharged from the solvent recovery system for reuse. Operation of valves 50, 51, 52, 53, and 54, and 55 allow shutting down one extractor-desolventizer pair while the recovery system continues to operate.

For maximum capacity each extractor and desolventizer pair could have it's own solvent recovery system.

Figure 2:
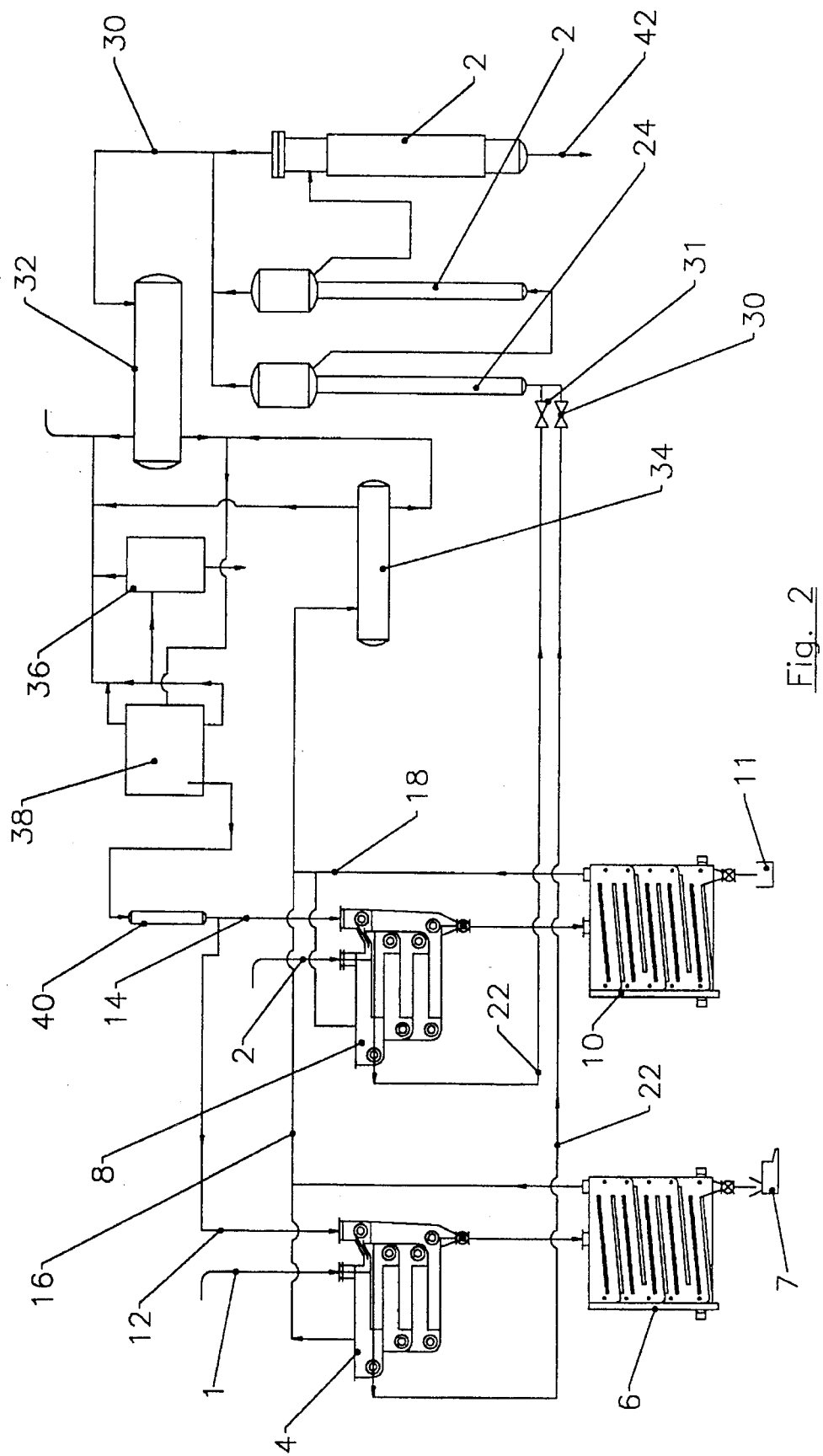
FIG. 2 shows the process in more detail.

In FIG. 2 we indicate that extractors 4 and 6 are a special type of extractor such as a Crown Model 4 that may be purchased from Crown Iron Works, P.O. Box 1364, Minneapolis, Minn. This is a staged type mixing and settling type extractor that will wash or extract very fine solids that would rapidly plug the screens or filter cloth that are used in most continuous extractors. Other mixing-settling type counter current extractors designed to allow settling of very fine solids should be equally useable.

In particular waste streams that contain edible oils and filter aid-catalyst mixtures, or in streams that contain edible oil and bleaching clay the solids are very light and a solvent such as hexane that is an excellent oil solvent and also has a very low viscosity has been proven to be one of the best choices of solvent.

Desolventizers or dryers 6 and 10 are specially constructed to strip off solvent from light solids.

Feed stream 1 feeding into extractor 4 may be a waste stream from edible oil hydrogenation that contains hydrogenated oil and nickel catalyst. Solvent 12 flows counter current to feed stream 4. We have found that with feed stream 1 containing about 50 percent solids that a solvent flow of about 4 to 5 pounds of solvent per pound of feed completely extracts the oil. The solvent containing the oil flows through line 20 to the solvent recovery system. Solids from the extractor 4 may be drawn off through a speed controlled star feeder valve into desolventizer 6. Desolventizer 6 has multiple heated trays that completely evaporate the residual solvent from the filter aid-catalyst mixture. This dry mixture is drawn off through a star feeder valve into pelletizer 7. It is necessary to pelletize the mixture in order to feed into a gas stream in an electromelt catalyst recovery unit.

The stripped off vapor from the desolventizer 6 joins the off-gas vapor from the extractor 4 and flows through line 16 into condenser 34 in the solvent recovery system.

Feed stream 2 feeding into extractor 8 may be a waste stream from edible oil bleaching that contains oil and bleaching clay. Solvent 14 flows counter current to feed stream 2. We have found that with feed stream 2 containing about 60 percent solids that a solvent flow of about 4 to 5 pounds of solvent per pound of feed completely extracts the oil. The solvent containing the oil flows from extractor 8 through line 22 to the solvent recovery system. Solids from the extractor 4 may be drawn off through a speed controlled star feeder valve into desolventizer 10. Desolventizer 10 is similar to desolventizer 6 and has multiple heated trays that completely evaporate the residual solvent from the bleaching clay. The dry bleaching clay is drawn off through a star feeder valve into container 11 for recycle.

The stripped off vapor from the desolventizer 10 joins the off-gas vapor from the extractor 8 and flows through line 18 to join line 16 and flow into condenser 34 in the solvent recovery system.

In the solvent recovery system solvent containing extracted oils flow through line 20 or line 22 into a first stage evaporator 24, with tails from evaporator 24 flowing through evaporator 26 into stripper 28. Oil completely stripped of solvent flows out drain 42 and may be recycled. Off gas vapors from the evaporators and stripper flow through line 30 to condenser 32. Recovered solvent from condenser 32 flows to the solvent-decanter feed tank 38 wherein the water is separated by the decanter and fed to a waste water heater to strip off residual solvent before discharging the water to the sewer. The stripped off vapor may go through a vent condensor (not shown)before going to the atmosphere. Solvent from the feed tank 38 goes through a solvent heater 40 to be heated to about 140 degrees Fahrenheit before recycling to the extractors 4 and 8. Solvent free edible oil drains out line 42 to be cooled and packaged or drummed for recycle.

What is claimed is:

1. A process to reclaim reusable products from two edible oil processing waste streams comprising the steps of:
    a) feeding one of said process waste streams containing a filter aid-nickel catalyst and edible oil into a first counter current solvent extractor means;
    b) feeding a solvent means into said first extractor to extract said edible oil from said filter aid and said nickel catalyst;
    c) pumping said solvent means exiting said extractor to a recovery system means wherein said edible oil is separated from said solvent and said solvent is recycled to said extractor;
    d) feeding said filter aid and said catalyst exiting said extractor to a first desolventizer unit means to separate said solvent means in a vapor form from said filter aid and said catalyst;
    e) pelletizing a mixture of said filter aid and said catalyst exiting said first desolventizer unit to allow direct feeding into an electromelt furnace for said nickel catalyst recovery;
    f) feeding said solvent vapor exiting said desolventizer into said recovery system;
    g) feeding a second of said process waste streams containing a used bleaching clay and edible oil into a second counter current solvent extractor means;
    h) feeding said solvent means into said second extractor to extract said edible oil from said bleaching clay;
    i) pumping said solvent means exiting said second extractor to said recovery system means wherein said edible oil is separated from said solvent and said solvent is recycled to said extractor;
    j) feeding said bleaching clay exiting said second extractor to a second desolventizer unit means to separate said solvent means in a vapor form from said bleaching clay;

k) packaging said bleaching clay exiting said desolventizer unit for recycle;

l) feeding said solvent vapor exiting said second desolventizer into said recovery system for recovery of said edible oil and recovery of said solvent.

2. A process to reclaim reusable products from two edible oil processing waste streams as in claim 1 wherein said solvent means is hexane.

3. A process to reclaim reusable products from two edible oil processing waste streams as in claim 1 wherein said solvent means is selected from the group consisting of inert hydrocarbons, alcohols, halogenated inert hydrocarbons and mixtures thereof.

4. A process to reclaim reusable products from oil processing waste streams as in claim 1 wherein said bleaching clay contains from about 0.1 to 70 percent edible oil by weight.

5. A process to reclaim reusable products from oil processing waste streams as in claim 1 wherein extraction in both said first and said second counter current extractor units is carried out between 100 and 165 degrees Fahrenheit.

6. A process to reclaim reusable products from oil processing waste streams comprising the steps of:

a) feeding a first of said processing waste streams containing a filter aid, nickel catalyst, and about 0.1 to 70 percent by weight soybean oil to a first solvent extractor;

b) feeding a second of said process waste streams containing a bleaching clay and about 0.1 to 70 percent by weight soybean oil to a second counter current extractor;

c) feeding a solvent means into said first extractor and said second extractor to extract said soybean oil from both said first and said second process waste streams;

d) feeding said filter aid and said catalyst exiting said first extractor to a first desolventizer unit wherein residual portion of said solvent means in a vapor form is separated from said filter aid and said catalyst;

e) feeding said bleaching clay exiting said second extractor to a second desolventizer unit wherein a residual portion of said solvent means is separated from said bleaching clay in vapor form;

f) feeding said solvent means exiting said first extractor and said second extractor in a liquid form and containing said soybean oil and said solvent means exiting said first and said second desolventizer in a vapor form to a recovery system wherein said solvent means is separated from said soybean oil and recycled to said first and said second extractors.

\* \* \* \* \*